(No Model.)
E. W. PAYNE.
WOOD CARRIER.
No. 398,902. Patented Mar. 5, 1889.
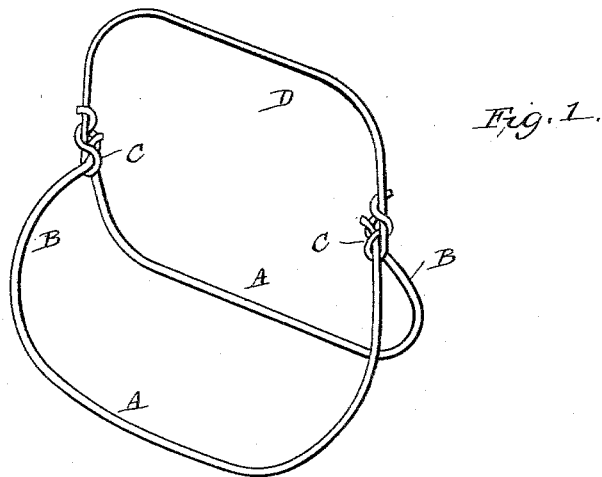
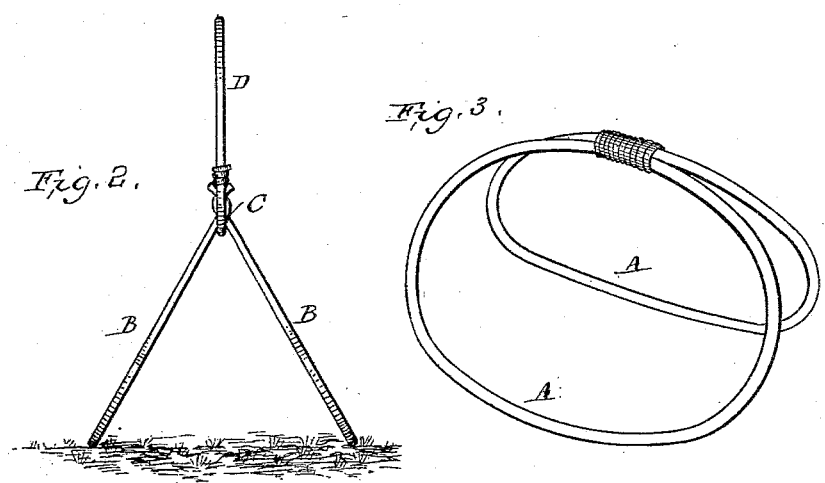
WITNESSES.
Edwin I. Yewell,
Chas Helm.
INVENTOR,
Edwin Waters Payne,
By John G. Manahan,
his Attorney.

UNITED STATES PATENT OFFICE.

EDWIN WATERS PAYNE, OF MORRISON, ILLINOIS.

WOOD-CARRIER.

SPECIFICATION forming part of Letters Patent No. 398,902, dated March 5, 1889.

Application filed February 23, 1888. Serial No. 264,903. (No model.)

*To all whom it may concern:*

Be it known that I, EDWIN WATERS PAYNE, a citizen of the United States, residing at Morrison, in the county of Whiteside and State of Illinois, have invented certain new and useful Improvements in Wood-Carriers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to improvements in wood-carriers; and it consists, essentially, in a simple light frame provided with two supporting-surfaces beneath the wood and one lifting or bail surface above the same.

My invention is designed as a cheap simple substitute for the ordinary method of carrying stove-wood upon the arm, and its advantages will be more specifically mentioned hereinafter.

In the drawings, Figure 1 is a side elevation, in perspective, of a device embodying my invention. Fig. 2 is an end view of the same. Fig. 3 is a modification of the same.

A A are the base-wires of the carrier, which support the latter when in a state of rest, and which furnish the support for the wood in the transportation of the latter. The wires A, which at the base are at a considerable distance each from the other, have upwardly-extending ends B, which converge centrally at C, and are there riveted or welded together or twisted spirally around each other, and the lower ends of the downwardly-extending extremities of the bail D are rigidly attached thereto by twisting the same in about the said ends. The connection of the converging ends B to the lower ends of the bail D may be pivoted, if desired; but I prefer to have the attachment of the bail to the ends B of a fixed nature, so that said bail may remain at all times in a vertical position. The convergence of the ends B is such that the central portions of the wires A are about ten inches apart; but the interval between the wires A may be of any desired width, being governed in that regard by the length of the wood to be carried. The wires A, however, should be sufficiently near each other that the wood, which is laid crosswise thereon, cannot drop through between the plates.

The central portions of the wires A are substantially parallel with each other and are formed horizontal, so as to rest more solidly upon the ground or other surface. If desired, the wires A may be furnished with suitable downwardly-extending legs, so as to raise said wires to a more convenient altitude.

The bail D has about the same conformation upward from the focus C that the wires A have downward therefrom, although the bail may be formed of a half-circle.

The size and relative distance of the parts will of course be governed by the size and length of the wood to be carried. In the construction which I have in use the distance between the foci C is about eighteen inches, and the greatest interval vertically between the bail D and wires A is about the same; and I find that the interval thus afforded is sufficiently large to contain about all the weight that an ordinary person will wish to carry with one hand.

The advantages of my invention will be sufficiently obvious to any one who has had experience in the usual mode of carrying stove-wood. That mode is to stoop down near the wood-pile and with one arm pile the wood upon the other. The latter arm furnishing but one bearing, great carefulness is required for preserving the equilibrium, and even then frequently before the armful is completed more or less of the wood falls therefrom, leaving the process to be recommenced, and with both arms occupied and loaded it is very laborious for the person to rise. Again, the getting down in the usual way to gather wood results more or less, particularly in the case of women, in soiling the clothes. Again, a large part of the wood in being thus transported presses directly against the stomach, heart, and breast, and it is a question whether any more exhaustive mode of carrying can be imagined. Again, in this mode one arm is employed in holding the wood in position upon the other, and the person is necessarily greatly embarrassed in the matter of opening and closing doors.

In the use of my invention the latter is merely placed in convenient relation to the wood-pile, resting on the wires A. The wood is placed endwise between the wires A and bail D until the interval between said parts is filled, or until the accumulation shall be as much as a person desires to carry. By seizing the bail D centrally with one hand the device and its contents can be carried with the same facility that one would carry a bucket or basket.

Another advantage in my device is that it and its contents can be set down at any point and picked up again without inconvenience or disarranging the wood, and at all times during the process of carrying the load one hand is free to open and close doors which may be interposed on the route, and my device with its load can be set down near the stove, either within the wood-box or independently thereof.

Again, my invention enables a person with but one hand or arm to carry wood with substantially the same facility that it can be done with two hands or arms. (In fact, the deprivation of one arm led the inventor to originate this device.)

The wood is placed transversely upon the wires A and is free to project any distance beyond the latter. Therefore the device is adapted to contain wood of varying lengths, and the distance between the wires A is less material, for the reason that the wires A permit the projection of the respective ends of the wood. The wires A at their lower portion should be such a distance apart that the longest wood may be supported at points sufficiently remote to prevent the wood from tipping endwise.

If the wires A and bail D are made sufficiently strong and stiff, perhaps an attachment of the bail at one end would be sufficient to afford supporting strength, in which event the other end might be left partially open to permit the wood to be placed on the plates sidewise; and the modification—such as shown in Fig. 3, which consists of two oblong rings placed side by side with their longest diameter horizontal, their lower sides divergent, and their upper sides brought together to furnish a bail— will operate with reasonable satisfaction, though I think the construction herein described is preferable.

My device, if made of metal, as intended, can be constructed very cheaply, light, and substantial.

What I claim as my invention, and desire to secure by Letters Patent of the United States, is—

A wood-carrier consisting of two base-wires and a bail, said base-wires having upwardly-extending and converging ends united to each other and to the ends of the bail in the manner described, whereby said base-wires are placed at a considerable distance apart at the base, and are thereby adapted to hold and support the wood laid crosswise thereon, and the bail is centrally and conveniently arranged for lifting and carrying.

In testimony whereof I affix my signature in presence of two witnesses.

EDWIN WATERS PAYNE.

Witnesses:
 WILLIAM A. PAYNE,
 ANDREW A. BROCK.